Jan. 28, 1964   E. V. HENC   3,119,312
ROTARY DIE CUTTING APPARATUS AND METHOD
Filed July 29, 1960   2 Sheets-Sheet 1
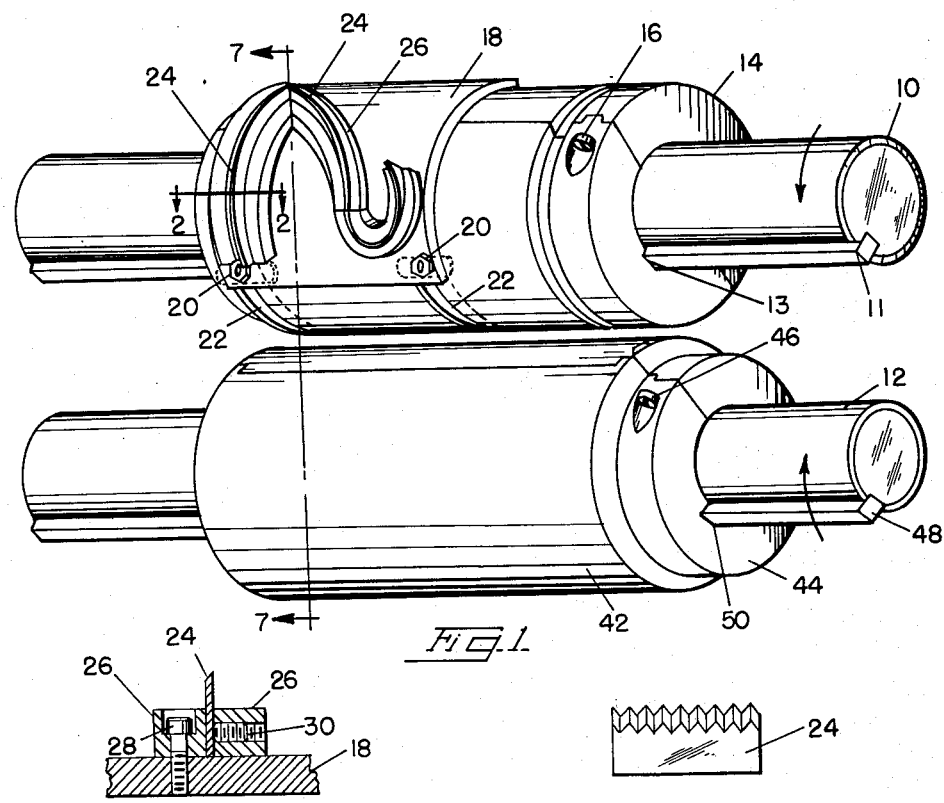
Fig. 1.
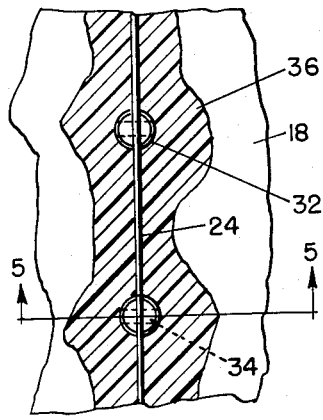
Fig. 2.
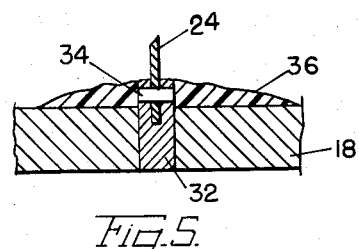
Fig. 3.
Fig. 4.
Fig. 5.
INVENTOR
EDWARD V. HENC Jan. 28, 1964  E. V. HENC  3,119,312
ROTARY DIE CUTTING APPARATUS AND METHOD
Filed July 29, 1960  2 Sheets-Sheet 2

INVENTOR
EDWARD V. HENC

United States Patent Office 3,119,312
Patented Jan. 28, 1964

3,119,312
ROTARY DIE CUTTING APPARATUS AND METHOD
Edward V. Henc, Broomall, Pa., assignor to Design & Manufacture, Inc., Philadelphia, Pa., a corporation of Pennsylvania
Filed July 29, 1960, Ser. No. 46,196
1 Claim. (Cl. 93—58.2)

The present invention relates to improvements in rotary die cutting apparatus and is concerned more particularly with improvements in methods and apparatus for cutting, scoring or blanking stock material employed in the paper or corrugated box and related industries.

It has been the general practice heretofore in such industries to perform the paper or corrugated board cutting and blanking operations in an off-set press using steel rule blades to do the cutting or blanking against a flat steel bed plate. Such prior operations have the disadvantage among others of relatively short life for the steel rule blade and resultant frequent need for resharpening and replacement.

It accordingly is the general purpose of the present invention to avoid the foregoing and other disadvantages of prior cutting and pattern blanking operations by providing a rotary type of die cutting apparatus wherein the die cutting blade life is relatively long, the sharpness actually increasing with continued use, and which is adapted, upon the making simple adjustments, to a great variety of cutting and blanking operations upon stock of various kinds and sizes.

It is a more particular object of the invention to provide a die cutting method and apparatus wherein the blades have a shearing action upon the paper or corrugated board stock and, in its more specific aspects, the invention contemplates the provision of serrated die blades which cooperate with a resilient anvil backing member preferably carried by a companion roller.

Another particular object of the invention is to provide a die head which is adjustable lengthwise of its supporting shaft for selective horizontal positioning and a die blade assembly which may be rotatably supported on the die head for selective vertical adjustment. The invention further contemplates that a plurality of such die heads and blade assemblies may be provided, any selected ones of which may be rendered operative by sliding the resilient anvils to backing up position opposed to the selected dies or rendered inoperative by sliding anvils away from backing up position. As an example of the flexibility of operation made possible by the present method and apparatus, the same set of dies may be used for cutting or scoring fixed length and width size of box blank material.

Still another particular object of the invention is the provision of improved means for mounting die blades in their saddle supports.

Other objects and advantages will be apparent from the following detailed description taken in conjunction with the accompanied drawings wherein preferred embodiments of the present invention have been selected for exemplification.

In the drawings:

FIG. 1 is a fragmentary perspective view of rotary die cutting apparatus as contemplated by the present invention, it being understood that the respective die and anvil supporting shafts are adapted to be supported and driven in any suitable manner;

FIG. 2 is a sectional view taken on the line 2—2 of FIG. 1 showing one manner of supporting the die blade in the blade holder and securing the blade holder to the mounting saddle;

FIG. 3 is an enlarged elevational view of a section of a serrated die blade which may be employed in the apparatus;

FIGS. 4 and 5 are, respectively, fragmentary plan and sectional views showing a modified manner of supporting the die blade upon the mounting saddle;

Figure 7:
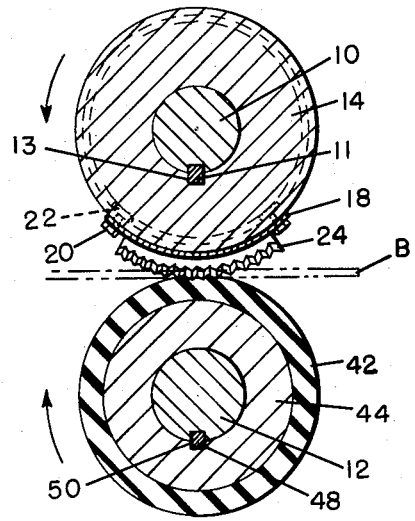
FIG. 7 is a sectional view taken on the line 7—7 of FIG. 1 but showing the blade in operative cutting position.

Referring more particularly to the drawings wherein like numerals refer to like parts, the apparatus as shown in FIG. 1, includes a die shaft 10 and a companion anvil shaft 12 which are supported for rotation in the direction indicated by the arrows by any suitable means, not illustrated because such means forms no part of the present invention. Supported upon and for rotation with the shaft 10 is a split die head 14 composed of opposed sections secured together at their ends in any suitable manner such as by the bolts indicated at 16. The die head 14 is adapted for multiple mounting of blade supporting saddles one of which is shown at 18. The saddles 18 are preferably mounted upon the die head 14 by means of T bolts 20 engaged in circumferential machined T slots 22 provided on the die head 14 so that when the T bolts 20 are loosened the saddle 18 may be rotated to any selected vertical position relative to the shaft 10. For adjustment of the die head 14 horizontally or axially of the shaft 10 the bolts 16 may be loosened and the die head shifted to selected position. A key 11 carried lengthwise of the shaft 10 and a companion or mating keyway 13 provided at the inner bore of the die head 14 prevent undesired rotation of the die head relative to the shaft.

The serrated die cutting blade 24 mounted upon the saddle 18 is preferably of the triangular pyramidal tooth shape as shown in FIG. 3. In the manner of mounting the die blade 24 upon the saddle 18 as shown in FIG. 2, a metal strip 26 shaped according to the cutting pattern desired is provided and is secured to the saddle 18 in any suitable manner such as by the bolts 28, as shown. The body portion of the strip 26 is channeled to receive the die blade 24 which is fixed in the channel by bearing pins 30.

In another manner of mounting the die blade upon the saddle, as shown in FIGS. 4 and 5, a plurality of upright blade holding pins 32 are carried by the saddle 18 and arranged in the configuration of the cutting pattern. The extended ends of the pins 32 are channeled to receive the blade 24 which is held therein by retainer pins 34 and the slotted blade holders 32 and the blade 24 are further locked in position by the application of the surrounding body of an epoxy or other suitable plastic material, as indicated at 36.

Figure 6:
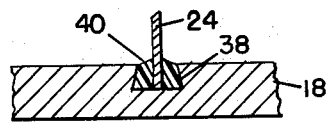
FIG. 6 is a sectional view showing another modified manner in which the die blade may be supported by the mounting saddle.

In still another manner of mounting the blade 24, as shown in FIG. 6, the surface of the saddle 18 is provided with a milled slot 38 conforming to the cutting pattern and the blade 24 is supported in the slot 38 by filling the slot with a body of epoxy or other suitable plastic holding material, as indicated at 40.

The backing anvil 42 against which the serrated die blade 24 bears is formed of flexible rubber or suitable resilient plastic or other material. The resilient anvil 42 is preferably in the form of a covering fixed to the split anvil head 44 which may be composed of opposed sections bolted together at their ends as indicated at 46. The mating key 48 and keyway 50 lock the anvil head 44 and the shaft 12 against relative rotation and the anvil 42 may be readily shifted to any selected position along the length of its shaft merely by loosening the bolts 46. When the anvil 42 is shifted away from its backing position opposed to the blade 24 as shown in FIG. 1, the blade is, of course, rendered inoperative, or the anvil 42 may be shifted to backing position opposed to other die heads and blades for other cutting operations. The adjustable arrangement of the parts therefor provides apparatus having great flexibility for various selected cutting patterns and for operation upon sheet material paper board or other stock of various sizes.

Figure 8:
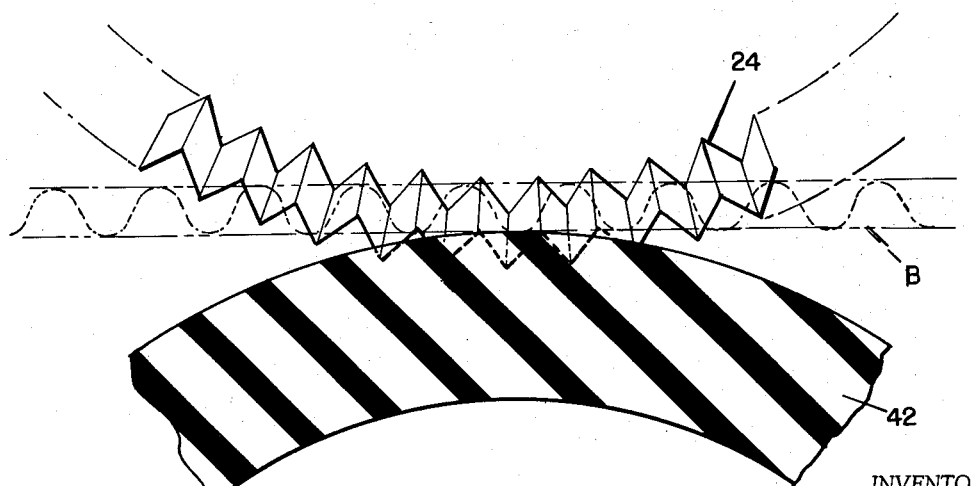
FIG. 8 is an enlarged detail view illustrating the coaction of the serrated die blade with the resilient backing anvil when corrugated board material is being passed through the apparatus and subjected to a cutting or shearing operation.

The serrated die blade 24 rotating against its resilient backing anvil 42 shears the sheet material passing between them. The coaction between the serrated die blade 24 and resilient backing anvil is best illustrated in FIGS. 7 and 8 wherein it will be seen that as each tooth of the serrated die blade is rotated into engagement with the board or other material indicated by B it shears entirely through the material and imbeds in the resilient anvil during its path of rotation. There is thus effected a rapid and clean shearing of the material in the pattern desired and the teeth of the serrated die blade which are not subjected to contact with any hard blunting surfaces retain their sharpness and cleanliness. In some instances the repeated shearing action of the blades increases their sharpness and the blade life is of exceptionally long duration.

It is to be understood that the present invention is not confined to the precise construction and arrangement of parts as herein illustrated and described but embraces all such modifications thereof as come within the scope of the following claim.

I claim:
A die cutting apparatus including
a first rotary shaft,
a rigid roll carried by, and adjustable longitudinally of, said shaft, said rigid roll comprising
a split die head,
a die-supporting saddle carried by said die head,
means for supporting said saddle on said die head for adjustment circumferentially of the axis of said first shaft,
a die having a blade with pyramidal teeth and detachably secured to said saddle,
a second shaft,
a backing up roll carried by said second shaft and adjustable longitudinally thereof, said backing up roll comprising
a split anvil,
a cylindrical, resilient covering completely, encircling said anvil, the distance between said teeth and the outer surface of said covering being only slightly less than the thickness of the material to be cut by said blade to limit penetration of said covering by said teeth.

References Cited in the file of this patent
UNITED STATES PATENTS

| | | |
|---|---|---|
| 2,364,342 | Bruker | Dec. 5, 1944 |
| 2,723,604 | Fischer | Nov. 15, 1955 |
| 2,942,534 | Boddy | June 28, 1960 |
| 3,000,237 | Phillips et al. | Sept. 19, 1961 |
| 3,012,451 | Kohler | Dec. 12, 1961 |